United States Patent
Bradley et al.

(10) Patent No.: US 11,996,957 B2
(45) Date of Patent: May 28, 2024

(54) METHOD FOR IMPROVED SYNCHRONIZATION BETWEEN A TRANSMITTER AND A RECEIVER ON A WIRELESS NETWORK

(71) Applicant: Morse Micro Pty. LTD., Surry Hills (AU)

(72) Inventors: Peter Bradley, Surry Hills (AU); Eyal Mendel, Surry Hills (AU)

(73) Assignee: Morse Micro Pty. LTD., Surry Hills (AU)

( * ) Notice: Subject to any disclaimer, the term of this patent is extended or adjusted under 35 U.S.C. 154(b) by 216 days.

(21) Appl. No.: 17/577,230

(22) Filed: Jan. 17, 2022

(65) Prior Publication Data

US 2022/0231884 A1    Jul. 21, 2022

(30) Foreign Application Priority Data

Jan. 15, 2021  (AU) .............................. 2021900074

(51) Int. Cl.
*H04L 25/02*    (2006.01)
*H04L 25/03*    (2006.01)
*H04L 25/497*   (2006.01)

(52) U.S. Cl.
CPC ...... *H04L 25/022* (2013.01); *H04L 25/03006* (2013.01); *H04L 25/497* (2013.01); *H04L 2025/03815* (2013.01)

(58) Field of Classification Search
CPC ............. H04L 25/022; H04L 25/03006; H04L 25/497; H04L 2025/03815
See application file for complete search history.

(56) References Cited

U.S. PATENT DOCUMENTS

| | | | |
|---|---|---|---|
| 8,159,932 B1 | 4/2012 | Hart et al. | |
| 9,332,514 B2 | 5/2016 | Sorin | |
| 11,337,085 B2* | 5/2022 | Sugaya | H04W 16/02 |
| 2011/0110470 A1 | 5/2011 | Yu et al. | |
| 2013/0064124 A1* | 3/2013 | Sun | H04L 27/2613 370/252 |
| 2013/0329815 A1* | 12/2013 | Kenney | H04L 27/266 375/259 |
| 2014/0204928 A1* | 7/2014 | Sorin | H04L 7/10 370/338 |
| 2015/0009954 A1* | 1/2015 | Chang | H04L 27/2613 370/330 |
| 2018/0014216 A1* | 1/2018 | Banerjea | H04W 56/0035 |
| 2018/0167254 A1* | 6/2018 | Ma | H04L 27/2663 |
| 2022/0132561 A1* | 4/2022 | Lin | H04W 74/004 |

* cited by examiner

*Primary Examiner* — Freshteh N Aghdam
(74) *Attorney, Agent, or Firm* — CP LAW GROUP PC; Cy Bates

(57) ABSTRACT

The present disclosure provides a method for estimating timing and/or frequency of a wireless signal; the method including the steps: receiving a digitally modulated signal; extracting a plurality of signal samples associated with a short training field (STF) of a PHY protocol data unit (PPDU) of an 802.11 frame; performing correlation operations on the plurality of signal samples to generate a predetermined number of correlation peaks; comparing the generated correlation peaks with a variable dynamic threshold; and calculating timing and/or frequency of the digitally modulated signal using the outcome of the comparing step.

22 Claims, 11 Drawing Sheets

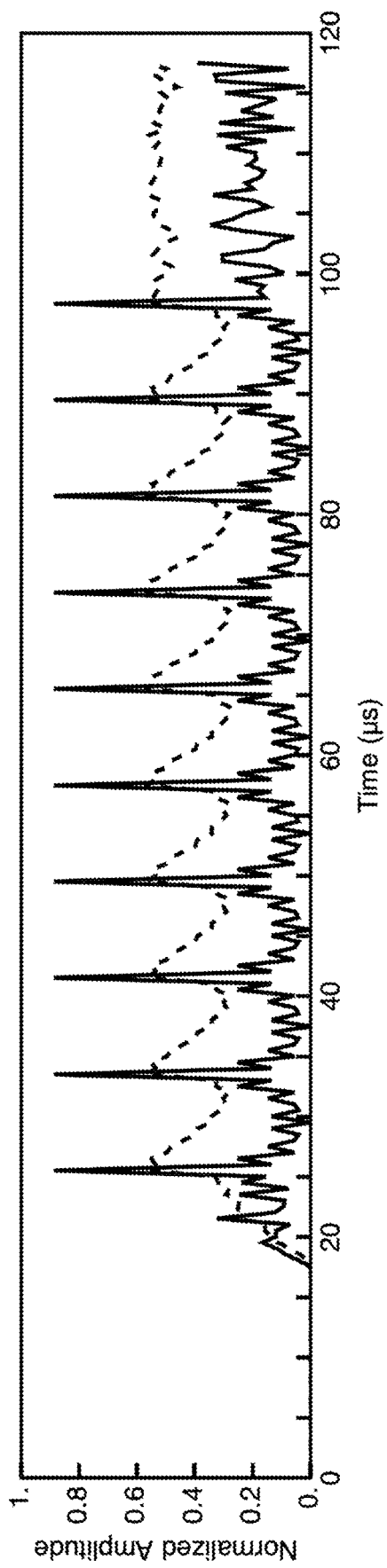
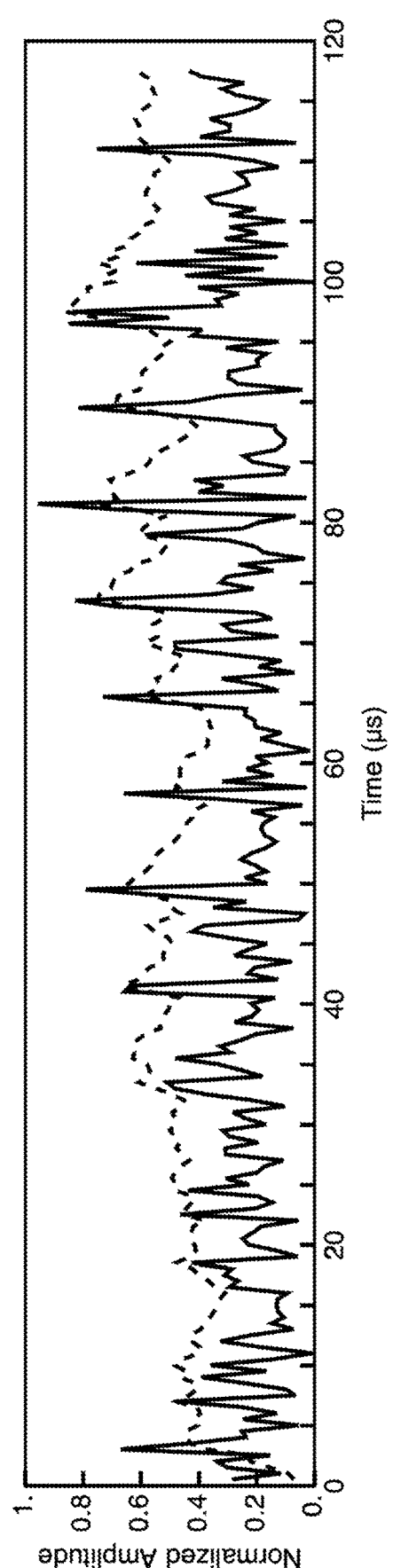
FIG. 5A
FIG. 5B

METHOD FOR IMPROVED SYNCHRONIZATION BETWEEN A TRANSMITTER AND A RECEIVER ON A WIRELESS NETWORK

FIELD OF THE INVENTION

The present disclosure relates to methodologies to estimate frequency and timing of an incoming digital signal by a wireless receiver implementing an 802.11-based WLAN protocol.

BACKGROUND

Timing and carrier synchronization is a fundamental requirement for any wireless communication system to work properly. Timing synchronization is the process by which a receiver node determines the correct instants of time at which to sample the incoming signal. Carrier synchronization is the process by which a receiver adapts the frequency and phase of its local carrier oscillator with those of the received signal.

Getting a digital radio setup and synchronized is difficult. The receiver must estimate a number of parameters related to the transmitter that are unknown at the beginning of the transmission.

The finite accuracy of crystal oscillators in the transmitter and the receiver is one of the main causes of timing and carrier synchronization offsets. Timing and frequency synchronization issues become more relevant as the data throughput rates increase, for example with more complex modulation schemes.

The IEEE 802.11 family of standards generally provides preambles on communication packets to synchronize timing, frequency, and detection, however there is room for further improvement.

SUMMARY OF THE INVENTION

A method for estimating timing and/or frequency of a wireless signal; the method comprising the steps:
receiving a digitally modulated signal;
extracting a plurality of signal samples from samples associated with a short training field (STF) of a PHY protocol data unit (PPDU) of an 802.11 frame;
performing correlation operations on the plurality of signal samples to generate a predetermined number of correlation peaks;
comparing the generated correlation peaks with a variable dynamic threshold; and
calculating timing and/or frequency of the digitally modulated signal using the outcome of the comparing step.

In embodiments, the variable dynamic threshold is configured to minimize a number of false peak detections.

In embodiments, the variable dynamic threshold decreases with a distance from a last detected correlation peak.

In embodiments, the variable dynamic threshold is calculated by applying low-pass filtering to the correlation peaks.

In embodiments, a scale factor based on the number of correlation peaks detected is used to scale an envelope of the variable dynamic threshold.

In embodiments, the step of comparing the generated correlation peaks with a variable dynamic threshold is performed in time windows only.

In embodiments, the predetermined time windows are calculated based on an expected frequency of the correlation peaks.

In embodiments, within the predetermined time window, the generated correlation peaks are compared with the variable dynamic threshold, whilst outside of the predetermined time window the generated correlation peaks are compared with a highest value of any correlation peak detected for the digitally modulated signal.

In embodiments, if a correlation peak higher than a highest correlation peak is detected outside of the predetermined time window thereby forming a new higher peak, a frequency and/or timing estimation process is restarted based on the new higher peak.

In embodiments, the estimation process is restarted only if the number of correlation peaks detected is lower than a predetermined minimum number of correlation peaks.

In embodiments, the step of performing correlation operations on the plurality of signal samples to generate a predetermined number of correlation peaks comprises cross-correlating the plurality of signal samples across at least 3 correlation peaks.

In embodiments, the step of performing correlation operations on the plurality of signal samples to generate a predetermined number of correlation peaks comprises autocorrelating the plurality of signal samples.

In embodiments, the step of performing correlation operations on the plurality of signal samples to generate a predetermined number of correlation peaks comprises averaging phase differences of the plurality of signal samples.

In embodiments, the method further comprises reducing the variable dynamic threshold after a first correlation peak has been detected to optimize the probability of detecting another correlation peak.

In embodiments, the method further comprises increasing the variable dynamic threshold once a predetermined number of correlation peaks related to the STF for the PPDU have been detected.

In embodiments, the method further comprises increasing the variable dynamic threshold after a predetermined amount of time corresponding with the duration of the STF, to minimize the probability of detection of a LTF side lobe.

In embodiments, the method further comprises comparing one or more correlation peaks related to the STF with a long training field (LTF) timing point to determine whether any detected correlation peaks should be discarded.

In embodiments, the method further comprises sensing an amount of energy on an Wireless Medium (WM) and setting a value of the variable dynamic threshold based on the amount of energy.

In embodiments, the method further comprises sensing baseline noise present on a channel and setting a value of a predetermined coefficient used to tune the variable dynamic threshold based on the baseline noise.

In embodiments, the method further comprises determining whether a false peak detection has occurred using one or more of the following steps:
restarting peak detection if a required number of correlation peaks is not detected in a predetermined time window;
calculating an average SNR metric from detected correlation peaks and determining a difference between a genuine pattern of correlation peaks related to a STF and a false detection pattern;
detecting a correlation peak with maximum intensity before reaching a required minimum number of correlation peaks;

detecting a large sudden change in correlation peak strength before a minimum number of correlation peaks is detected.

In accordance with the second aspect, the present invention provides a method for estimating timing and/or frequency of a wireless signal; the method comprising the steps of:

calculating a first estimate of timing and/or frequency of a wireless signal using a method in accordance with the first aspect, the first estimate being based on a short training field (STF) of the PHY protocol data unit (PPDU);

calculating a second estimate of timing and/or frequency of the wireless signal based on a long training field (LTF) of the PHY protocol data unit (PPDU);

calculating a third estimate of timing and/or frequency of the wireless signal based on a combination of the first estimate and the second estimate;

wherein the third estimate has a higher accuracy than the first estimate and the second estimate.

In embodiments, the step of calculating a second estimate of timing and/or frequency of the wireless signal comprises performing autocorrelation using 64 samples of the signal.

In embodiments, the step of calculating the third estimate comprises using the first estimate to unwrap the phase of the second estimate.

In embodiments, the step of calculating the third estimate comprises calculating weighting coefficients for each correlation peak and weighting the STF correlation peaks using the identified coefficients.

Advantages of embodiments of the invention include the capability of performing a correct estimation of the frequency even when the initial frequency gap is large. The advanced algorithms used to leverage signal data from the STF and LTF fields, in combination, lead to more accurate frequency and timing estimates.

In addition, embodiments of the invention allow maintaining a low sample rate which facilitates lower complexity whilst maintaining estimation accuracy.

BRIEF DESCRIPTION OF THE DRAWINGS

For proper understanding of the invention, reference should be made to the accompanying drawings, wherein:

FIG. 5A shows two plots illustrating the cross-correlation output (full line) and the dynamic threshold (dashed line) for a high SNR;

FIG. 5B shows two plots illustrating the cross-correlation output (full line) and the dynamic threshold (dashed line) for a low SNR;

DETAILED DESCRIPTION OF THE INVENTION

Figure 1A:
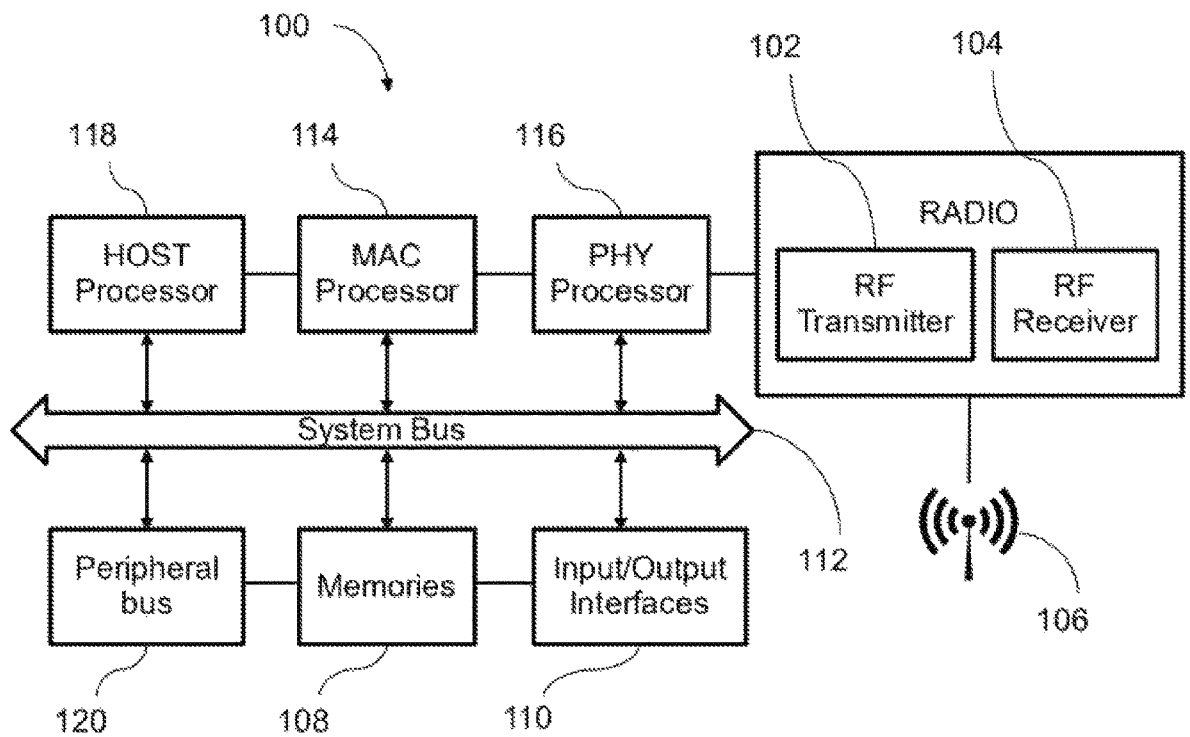
FIG. 1A shows a high-level block diagram of a WLAN device.

Modern wireless local area networks (WLANs), such as WLANs based on the IEEE 802.11n, 802.11ac, 802.11ax and 802.11ah use orthogonal frequency-division multiplexing (OFDM) to encode signals at the physical (PHY) level.

For purposes herein, the term "WLAN", or wireless LAN, means a wireless computer network that links two or more devices using wireless communication to form a local area network (LAN) within a limited area.

The term "Physical (PHY) processor" means processing hardware capable of implementing functions of the PHY layer of the IEEE802.11 standard to interface with the wireless medium.

The term "Media Access Control (MAC) processor" means processing hardware capable of implementing functions of the MAC layer of the IEEE802.11 standard.

The term "PHY Protocol Data Unit (PPDU)" means basic unit of information transmitted over the network at the PHY level.

The term "wireless receiving station (STA)" means a networking device capable of communicating with an access point over a wireless network.

The term "access point (AP)" means a networking device capable of communicating with several client devices (stations) over a wireless network and capable to interface with a wired network. For example, an 802.11 Wi-Fi access point.

The term "sleep-clients" means devices that share the platform with the WLAN device that require access to the WLAN device to perform their functions. For example, these devices may need to send data over the wireless medium.

The term "memory banks" means any form of digital memory for storing digital information.

The term "input and output interfaces" means hardware or software data exchange means for transferring data to and from electronic devices. For example, digital data exchange or diagnostic serial buses, such as GPIO bus or USB.

The term "short training field (STF)" means a field of the IEEE802.11 family of standards that includes a small number of samples that facilitate signal synchronization.

The term "long training field (LTF)" means a field of the IEEE802.11 family of standards that includes a larger number of samples that facilitate signal synchronization.

The term "correlation peak" means a peak in the output signal of a correlator module.

The term "STF correlation peak or STF peak" means a correlation peak from a correlator based on input signals related to STF samples.

OFDM is a technique used to modulate information over multiple carriers. In OFDM systems, at the transmitter side, an Inverse Fast Fourier Transform (IFFT) is applied to create an OFDM symbol, and a cyclic prefix is appended to the start of an OFDM symbol. At the receiver, the cyclic prefix is removed, and a Fast Fourier Transform (FFT) is applied to the received OFDM symbol. The length of the cyclic prefix is designed to be larger than the span of the multipath channel. The portion of the cyclic prefix which is corrupted due to the multipath channel from the previous samples is known as the inter-symbol interference (ISI) region. The remaining part of the cyclic prefix which is not affected by the multipath channel is known as the ISI-free region.

In OFDM systems, the presence of timing offset (TO) affects the system performance: If the TO lies within the ISI-free region of the cyclic prefix, the orthogonality among the subcarriers is not destroyed and the timing offset only introduces a phase rotation in every subcarrier symbol. For a coherent system, this phase rotation is compensated for by the channel equalization scheme, which views it as a channel-induced phase shift. If the TO is outside the limited ISI-free region, the orthogonality among the subcarriers is destroyed by the resulting ISI and additional inter carrier interference (ICI) is introduced.

Thus, the objective of timing synchronization in OFDM systems, unlike in single-carrier systems, is to identify the start of an OFDM symbol within the ISI-free region of the cyclic prefix. The presence of carrier frequency offset (CFO) in OFDM systems attenuates the desired signal and introduces ICI since the modulated carrier is demodulated at an offset frequency at the receiver side. In OFDM systems, CFO is usually represented in terms of subcarrier spacings and can be divided into an integer part (integer number less than the total number of subchannels) and a fractional part (within ±½ of subcarrier spacing). If the CFO is greater than the subcarrier spacing, a receiver has to estimate and compensate for both the integer and fractional parts of the normalized CFO.

The synchronization in OFDM systems can be performed either in the time domain or the frequency domain depending upon whether the signal processing is executed pre-FFT or post-FFT at the receiver, respectively.

IEEE 802.11 standards based on OFDM typically provide a short training field (STF) and a long training field (LTF) in the physical protocol data unit (PPDU) that are used for time and frequency synchronization. The STF is generally used for packet detection and coarse frequency offset, whilst the LTF is used for timing synchronization and fine frequency offset. The LTF can also be used for channel equalization.

The standard synchronization methods provided by the 802.11 family of standards using the STF and LTF fields perform differently for different boundary conditions. For 802.11ah, for example, precise synchronization is paramount, given the extended range provided by the sub-gigahertz modulated packets. For extended distances between the transmitter and receiver, the SNR at the receiver may be low. Therefore, the frequency estimation in this case may cause errors (such as 'wrap around').

The STF is placed at the beginning of the wireless frame and comprises a number of peaks that facilitate coarse frequency synchronization. Generally, modern Wi-Fi chips use only 2 or 3 peaks of the available 10 in the STF. The same applies to the LTF, where only a subset of the available 64 samples is used.

In addition, applying only a coarse STF frequency estimate to the channel estimate data and a finer estimate for the remaining packet degrades the achievable sensitivity. Of the 3 performance requirements (packet detection, timing, and frequency), the most challenging is frequency estimation which must maintain small estimate variances at low SNR.

FIG. 1A shows a high-level block diagram of a WLAN device 100 implementing a STA or AP according to some embodiments. Each of the network devices includes a MAC layer and a PHY layer in accordance with IEEE 802.11.

WLAN device 100 includes a radio frequency (RF) transmitter module 102, an RF receiver module 104, an antenna unit 106, one or more memory banks 108, input and output interfaces 110 and communication bus 112. Furthermore, the device 100 includes a MAC processor 114, a PHY processor 116 and a HOST processor 118. These processors can be any type of integrated circuit (IC) including a general processing unit, an application specific integrated circuit (ASIC) or RISC-V based ICs, amongst others.

The memory 108 stores software including at least some functions of the MAC layer. Each processor executes software to implement the functions of the respective communication/application layer.

The PHY processor 116 includes a transmitting signal processing unit and a receiving signal processing unit and manages the interface with the wireless medium (WM). The PHY processor 116 operates on PPDUs by exchanging digital samples with the radio module which comprises the RF transmitter 102, the RF receiver 104, analog-to-digital converters and digital filters.

The MAC processor 114 executes MAC level instructions and manages the interface between the STA application software and the WM, through the PHY processor 116. The MAC processor 114 is responsible for coordinating access to the WM so that the Access Point (AP) and STAs in range can communicate effectively. The MAC processor adds header and tail bytes to units of data provided by the higher levels in the STA and sends them to the PHY layer for transmission. The reverse happens when receiving data from the PHY layer. If a frame is received in error, the MAC processor manages the retransmission of the frame.

The peripheral bus 120 connects to a number of peripherals that support core functions of the wireless device, including timers, interrupts, radio/filters/system registers, counters, UART, GPIO interfaces and others.

The HOST processor 118 interfaces with the MAC layer and is responsible for running higher level functionalities of the STA.

The PHY processor 116, the MAC processor 114, the HOST processor 118, the peripheral bus 120, memories 108 and input/output interfaces 110, communicate with each other via the bus 112. The memory 108 may further store an operating system and applications. In some embodiments, the memory may store recorded information about captured frames and packets. The input/output interface unit 110 allows for exchange of information with a user of the STA.

The antenna unit 106 can include a single antenna or multiple antennas to implement Multiple Input Multiple Output (MIMO) techniques.

Figure 1B:
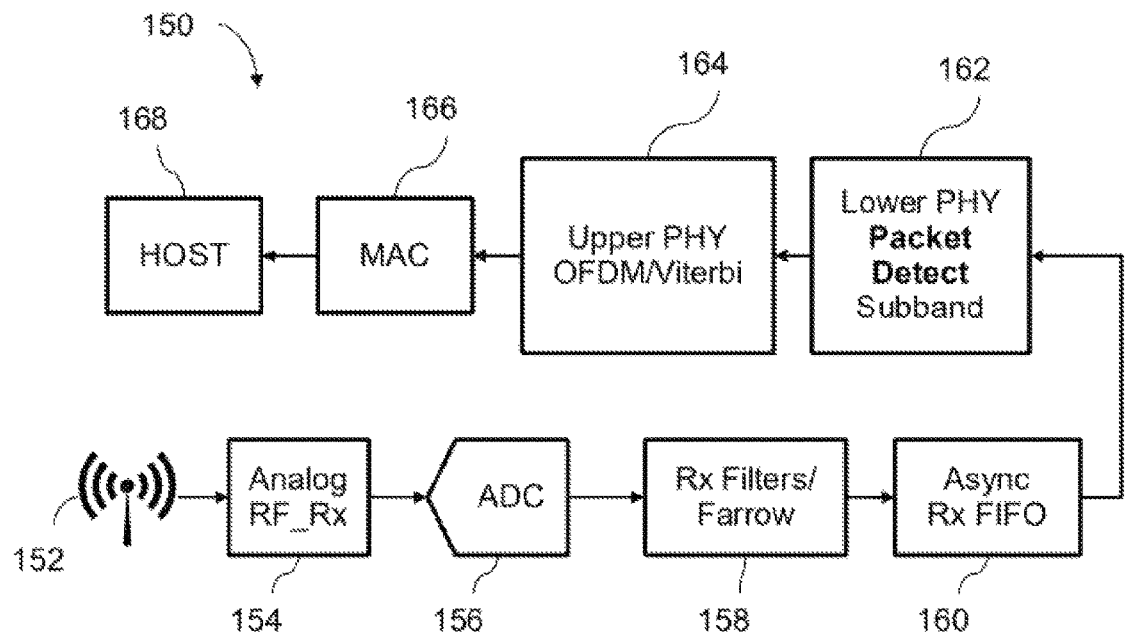
FIG. 1B shows a receiver data flow architecture used to receive Wi-Fi packets over the network.

FIG. 1B shows a schematic block diagram of the receiver data flow architecture 150 that is used to receive Wi-Fi packets over the network. Radio signals are received over the WM and translated into electrical signals by the receiving antenna 152. The received signal is conditioned using a series of analog filters 154 before being converted into a digital equivalent using an analog-to-digital converter 156. The sampled signal is conditioned again using digital filters and a farrow 158 before the samples are collected in an asynchronous receiving first-in-first-out (FIFO) data structure 160.

Samples in FIFO structure 160 can be accessed by a plurality of modules. Two important modules that have access to the FIFO 160 are the packet detect module and the subband module, which are part of a lower-level portion 162 of the PHY processor 116, which is a portion of the higher-level diagram of FIG. 1A.

The packet detect module comprises hardware and algorithms that analyze the initial sections of the PHY protocol data unit (PPDU) in the time domain with the aim of recognizing an 802.11 frame and synchronize frequency and timing of the STA with the packet being received. The sub-band module comprises hardware that allows detecting which subchannel in the allocated frequency band is being used by the AP for the packet being received.

Once a packet is detected and the relevant subchannel is established, samples can be forwarded to an upper-level portion 164, which is another portion of the PHY processor 116, and processes and decodes the OFDM symbols, with the support of a coprocessor module, to reconstruct the full PPDU. The PPDU is processed by the MAC layer processor 166 that extracts the data payload and provides the relevant information to the HOST layer 168 for consumption.

The present disclosure relates to a series of algorithms implemented in the packet detect module that leverage the signal samples associated with a short training field (STF) of the PHY protocol data unit (PPDU) of an 802.11 frame and/or signal samples associated with a long training field (LTF) of the PHY protocol data unit (PPDU) of an 802.11 frame to provide accurate frequency and/or timing synchronization at the receiver end.

Figure 2:
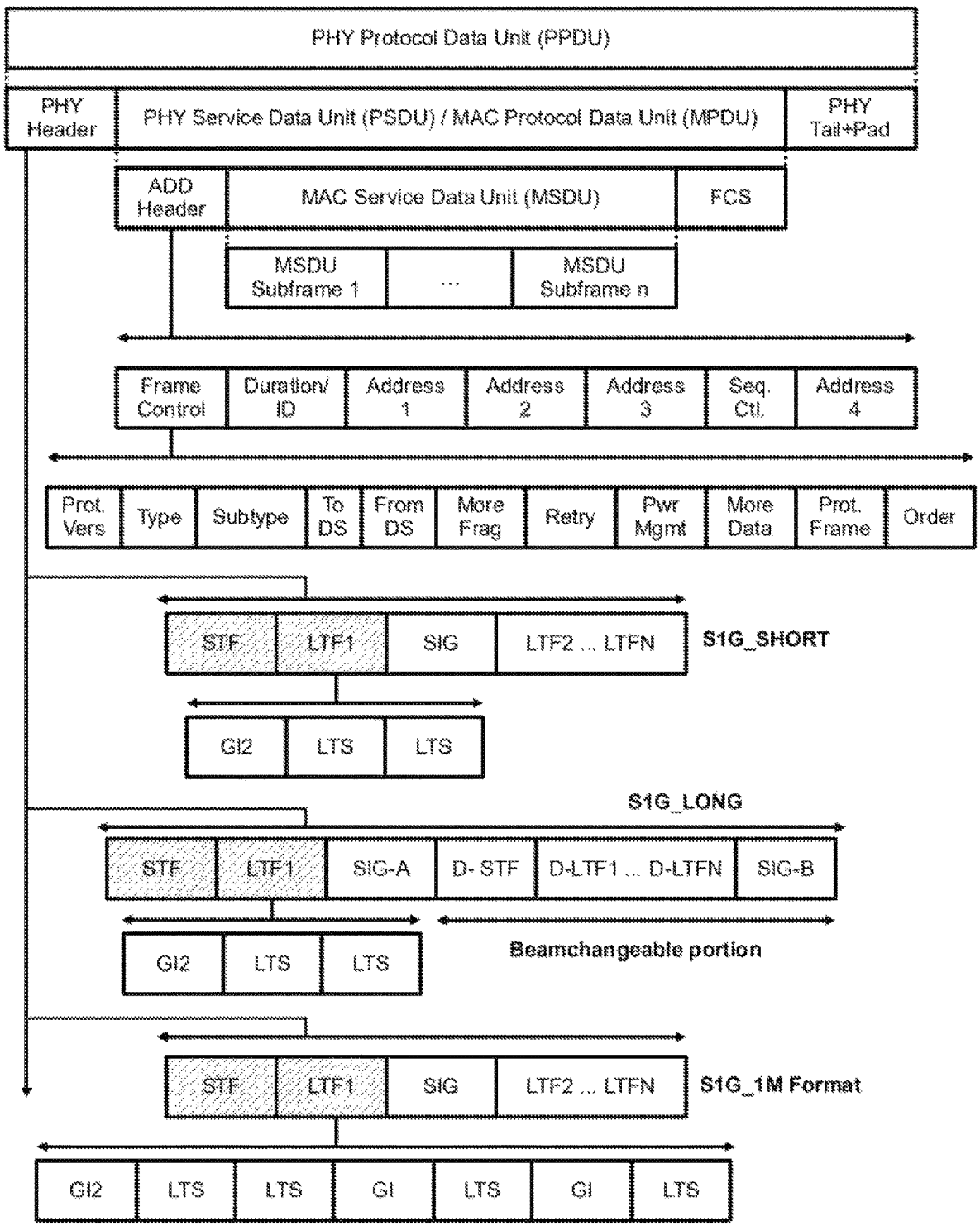
FIG. 2 schematically shows the structure of a PPDUs used in the IEEE 802.11ah standard, also known as S1G PHY PDU.

FIG. 2 schematically shows the structure of a PPDUs used in the IEEE 802.11ah standard also known as S1G PHY PDU. The scope of this disclosure, however, is not limited to 802.11ah. A person skilled in the art would recognize that the methodology described herein could be applied to other Wi-Fi standards with minor modifications.

In 802.11ah the configuration of the PPDU varies slightly depending on the bandwidth of the subchannel being used for transmission and format parameters. For example, the 1 MHz PPDU can be used in S1G and S1G duplicate formats. For channel bandwidths higher than or equal to 2 MHz, the PPDU can be used in SHORT or LONG formats. More detailed information on PPDU formats can be found at section 23 of the IEEE 802.11ah standard publicly made available by the IEEE.

FIG. 2 shows that all the different formats of the PHY header on the 802.11ah begin with a short training field (STF) field followed by a long training field (LTF) (dashed filling). This configuration of the PHY header is common to all standards in the 802.11 family.

In the 802.11ah case, the STF may comprise repeated 10×8 sample patterns intended for coarse frequency estimation and initial packet and timing detection. The LTF may comprise a guard interval followed by 2×40 patterns intended for fine frequency estimation and final packet and timing point detection. In addition, the LTF is used for channel estimation to mitigate multipath propagation effects. The configuration of the STF and LTF can change slightly depending on the type of PPDU.

Figure 3A:
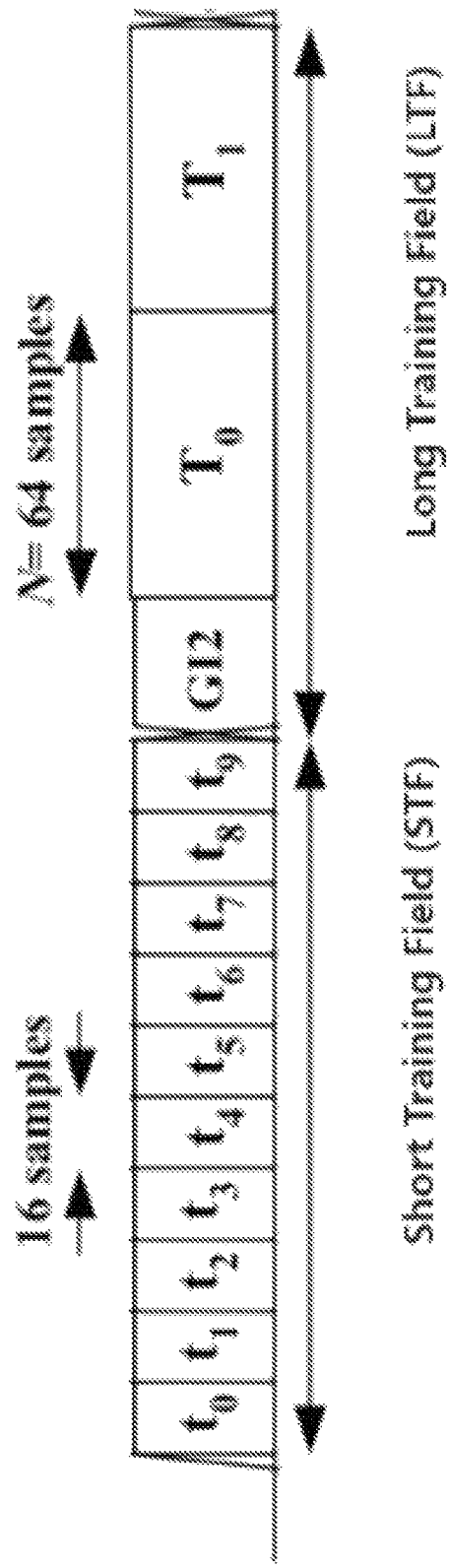
FIG. 3A shows the structure of the STF and LTF fields used in the 802.11ah PPDU.

The algorithms described in this disclosure use the STF and LTF fields defined as per 802.11ah section 23.3.2 and shown in FIG. 3A. The STF comprises repeated 10×16 sample patterns intended for coarse frequency estimation and initial packet and timing detection. The LTF comprises a guard interval followed by 2×64 patterns intended for fine frequency estimation and final packet and timing point detection. In addition, the LTF is used for channel estimation to mitigate multipath propagation effects.

In order to meet the maximum degradation in sensitivity specified by the standard, the variance of the frequency estimate as determined by initial system simulations must be within ±750 Hz (90% confidence intervals at high SNR). At lower SNRs this becomes even more constraining (0 dB SNR equals to ±450 Hz).

The design of the STF sequence lends itself to either autocorrelation or cross-correlation methods. This disclosure provides a method for estimating timing and/or frequency of a wireless signal that leverages all the correlation peaks extracted from the STF field.

Figure 3B:
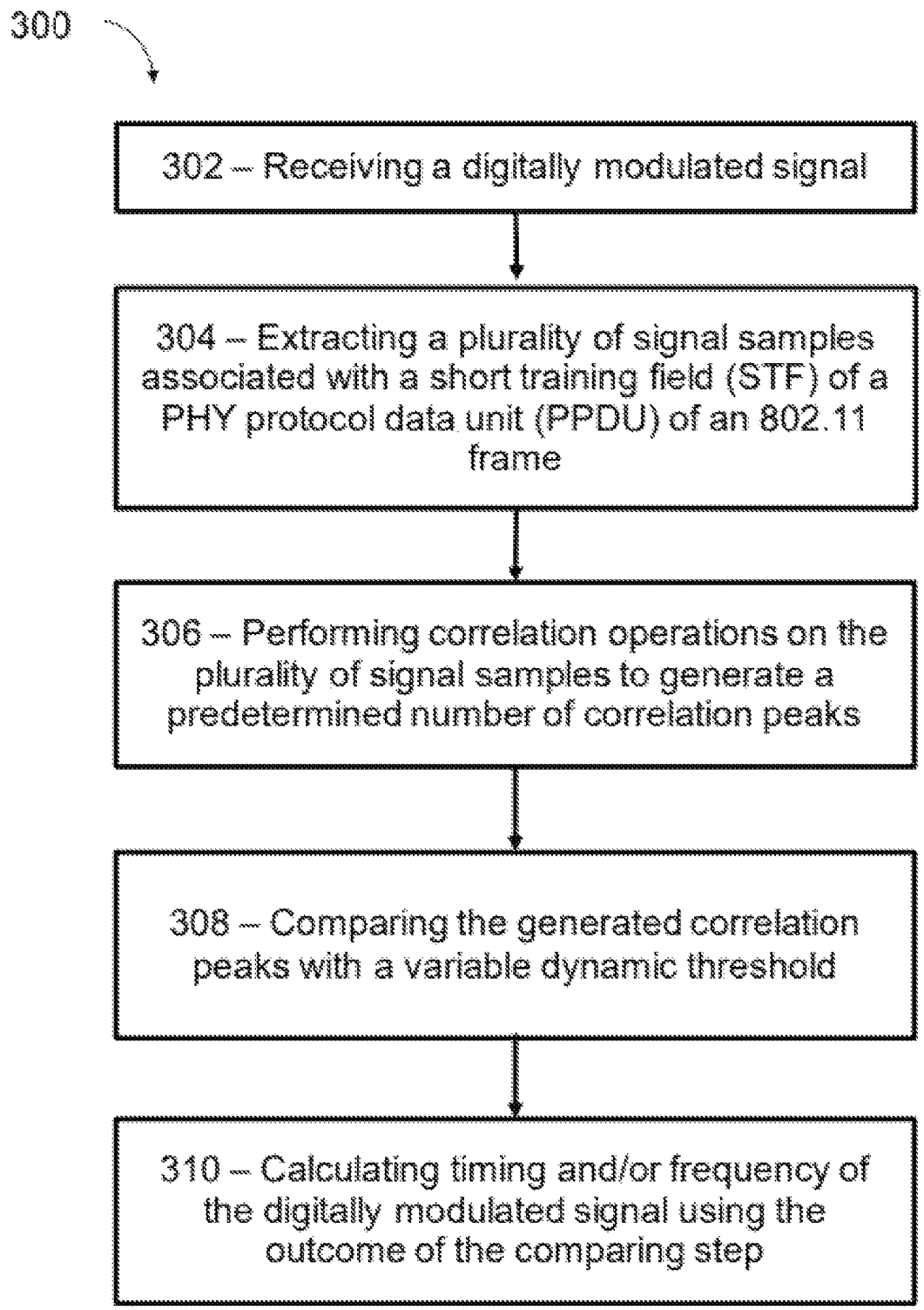
FIG. 3B shows a flow diagram of an example of a method used for frequency synchronization, in accordance with embodiments.

FIG. 3B provides a flow diagram listing steps of the method, namely, receiving a digitally modulated signal (302); extracting a plurality of signal samples from samples associated with a short training field (STF) of a PHY protocol data unit (PPDU) of an 802.11 frame (304); performing correlation operations on the plurality of signal samples to generate a predetermined number of correlation peaks (306) comparing the generated correlation peaks with a variable dynamic threshold (308); calculating timing and/or frequency of the digitally modulated signal using the outcome of the comparing step (310). The minimum and maximum number of correlation peaks is kept programmable to account for use cases where we may have fewer peaks (e.g., AGC operates or antenna diversity switching).

Figure 4A:
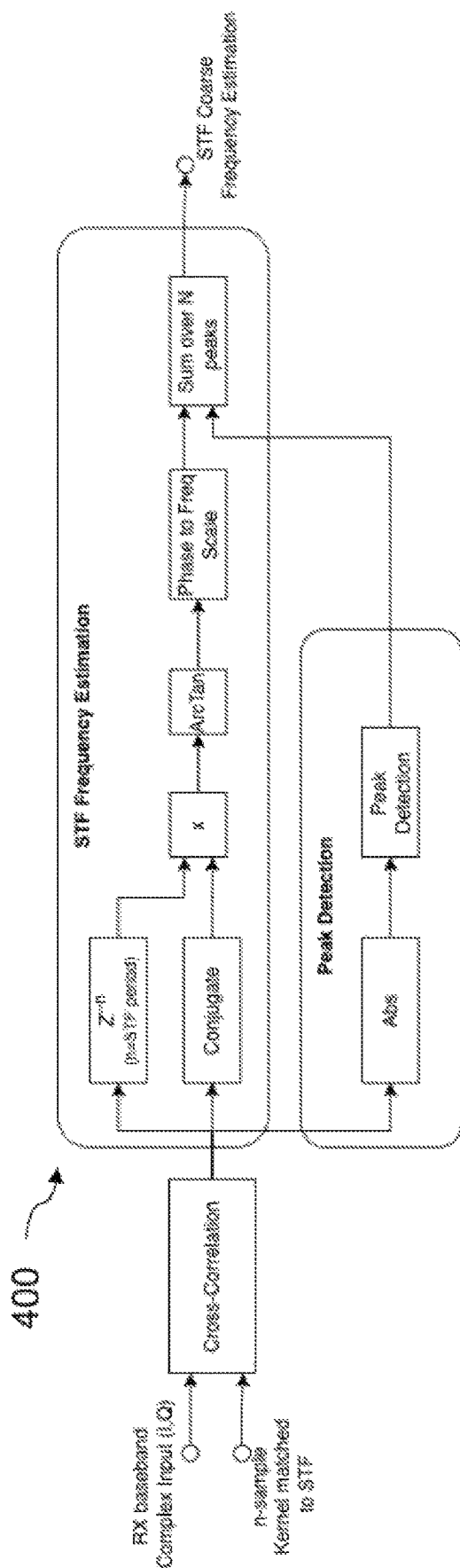
FIG. 4A shows a block diagram of a programmable peak averaging method in accordance with embodiments.

FIG. 4A shows a block diagram of a system 400 to implement the method of FIG. 3B for frequency detection based on the SFT field. The system 400 allows using a programmable number of correlation peaks, generally larger than 3. Using all the 10 STF correlation peaks provides the best estimate for the frequency. In some instances, the signal can be oversampled before the correlation step to achieve more accurate correlation. Another advantage of the cross-correlation approach with phase averaging is the requirement for less overall digital logic gates.

Figure 4B:
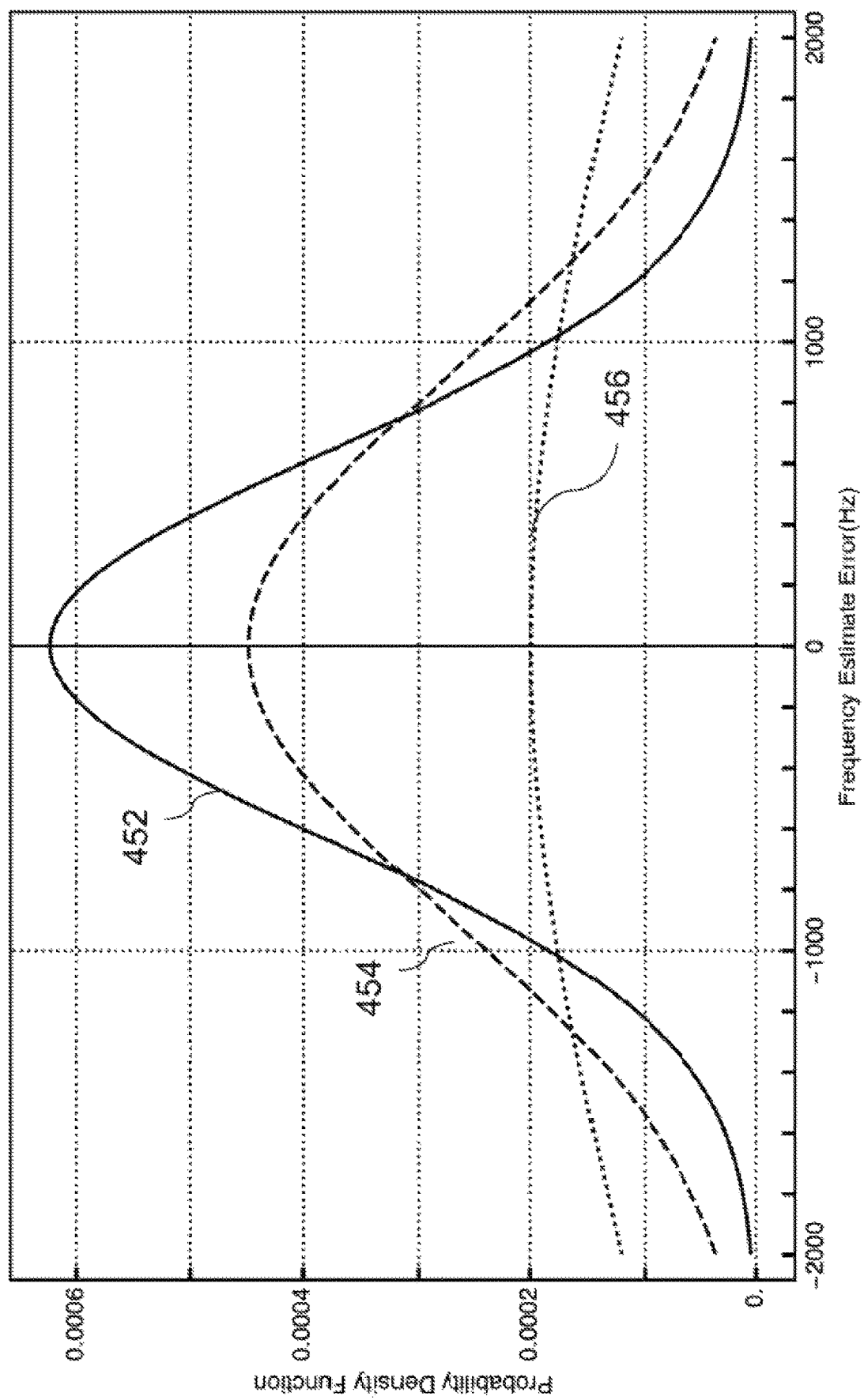
FIG. 4B shows distributions of the frequency estimation errors obtained using different embodiments of the method of FIG. 3B.

FIG. 4B shows typical distributions of the frequency estimation errors obtained using the method of FIG. 3 and using different numbers of peaks.

Figure 6:
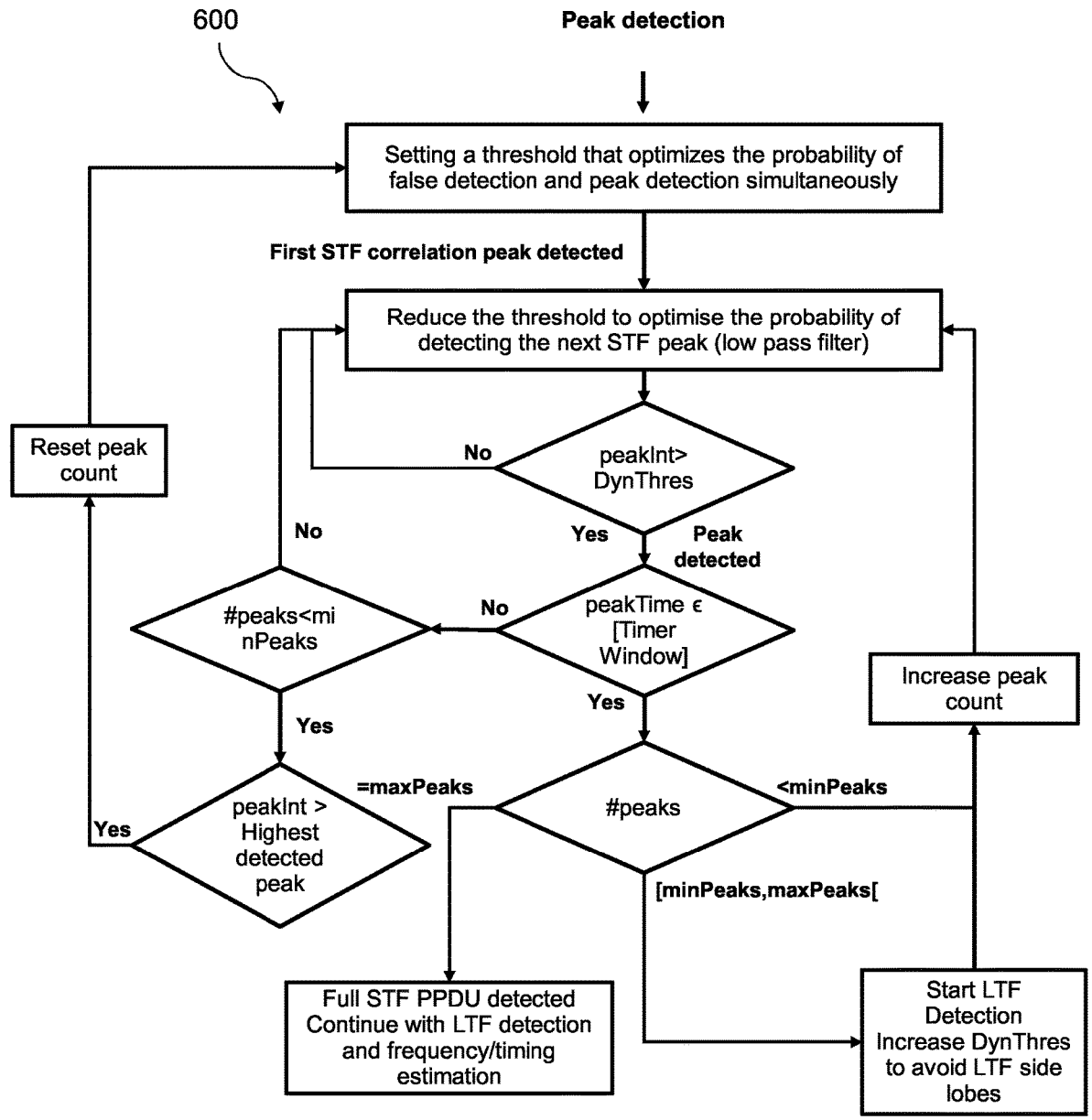
FIG. 6 shows a flow diagram that outlines the steps followed for correlation peak detection and dynamic threshold management using a timer window, in accordance with embodiments.

The best results are obtained using cross-correlation operations, averaging phase differences and some of the algorithm disclosed herein, for example with reference to FIG. 6, for eight correlation peaks shown by the solid line 452. Importantly, even this scheme will sometimes use as low as 3 peaks, for example when it detects the packet late or too early. Method steps, such as timing interpolation, can be introduced to remove the effect of spurious peaks while retaining good average performance.

The distribution of errors for cross-correlation operations and averages based on three correlation peaks is represented by the dotted line 454, and shows acceptable but poorer performance than 8 cross-correlation peaks. In this specific example, the algorithm based on autocorrelation and three peak averaging shows the worst performance in the dotted line 456. Autocorrelation has the advantage of being less sensitive to timing point selection but requires a large gate count 128 sample windowed integrator.

The data of FIG. 4B was obtained with a 'worst case' scenario' set of conditions for noise levels (SNR=2 dB), frequency offset (38 kHz) and fractional delay (0.5). The data shows that the accuracy of frequency estimate is a strong function of the number of peaks used and, with only 3 peaks, many estimates are inaccurate or out of range.

Cross-correlation based frequency estimators require robust timing points with consistent spacing between peaks. In addition, false detections must be minimised prior to the wanted signal as well as false detections after, since both of these may corrupt the frequency estimate as well as provide an excessively erroneous timing point for the LTF.

Embodiments of the methodology described include the step of comparing the output of each correlator with a variable dynamic threshold while correlating the plurality of signal samples. The variable dynamic threshold is managed to minimize the number of false peak detections. In some instances, the baseline noise present on the channel multiplied for a predetermined coefficient can also be used to weight the value of the dynamic threshold. Furthermore, in embodiments, the method further comprises the step of sensing the amount of energy on the WM and setting a value of the threshold based on this amount of energy.

FIGS. 5A and 5B show two plots including the cross-correlation output (solid line) and the dynamic threshold (dashed line).

FIG. 5A shows a case with a very high SNR. Despite the high SNR, small unwanted correlation peaks called side-lobes exist since the signal pattern is not ideal for cross-correlation. The dynamic threshold decreases with the distance from the last detected peak showing a low-pass filter behavior. This allows increasing the probability of detection of the next STF correlation peak.

FIG. 5B shows a 2 dB SNR case. The example of FIG. 5B provides a few challenges related to the low SNR. The first 2 STF correlation peaks are missed since the dynamic threshold has been elevated by noise prior to the first peak. Then a "rogue" LTF side lobe peak is detected. A total of 9 peaks is detected but the last is incorrect. Importantly, there is a large number of noise peaks above threshold between desired peaks. The timing of the incoming waveform has been fractionally delayed giving a peak that is reduced in amplitude and spans two samples. The effect of the low sample rate is to reduce the peak amplitude relative to noise and this makes accurate peak detection more challenging.

There is a very high probability of detecting unwanted noise peaks between wanted peaks. Therefore, in embodiments, the step of comparing the output of each correlator with a variable dynamic threshold is performed in predetermined time windows. Such time windows may be calculated based on the expected frequency of the incoming correlation peaks. The time windows may be managed by using a dedicated timer.

The timer is referenced to the first peak detection and has two functions:
  Tracks the timing point relative to the first peak so that peak averaging can be used to find an optimal timing point and then select precise peak data for the frequency estimate.
  Disables any peak detection for a specified number of samples between peaks. This allows using a low threshold following the first peak detection, as shown in FIG. 5A, since the detection is only enabled for small time windows.

There are several signal phases in which the threshold may have to react differently. In embodiments, a scale factor based on the number of peaks detected is used to scale the envelope of the dynamic threshold.

The table below provides examples of scale factors (T1 . . . T4) used in different peak ranges to optimize peak detection performance.

| Number of Peaks Detected | Example Scale Factor | Comment |
| --- | --- | --- |
| 0 | T1 = 5.5 | Prior to STF. Gaussian noise floor. Threshold set to minimize false alarms and peak detection loss. |
| 1 to minPeaks-1 | T2 = 2.5 | STF signal and first peak detected. Threshold can be reduced to ensure detection of the next peak. |
| minPeaks to maxPeaks-2 | T3 = 1.8 | Packet detected. False alarm is no longer an issue. Ensure all peaks are detected. |
| maxPeaks-1 | T4 = 3 | Looking for the last peak. Raise the threshold to avoid detection of the LTF "rogue" side lobe. |

The value of the peak ranges boundary (minPeaks) and the scale factors (T1 . . . T4) can be varied to optimize peak detection if necessary. In some embodiments, the PHY processor may perform a dynamic optimization of these parameters based on the synchronization performance in real time. In some cases, such optimization may employ a machine learning algorithm.

minPeaks is the minimum number of peaks required to detect a packet. maxPeaks is the maximum number of peaks present in the STF. A number of peaks below maxPeaks may be available if a missed peak occurs after minPeaks has been exceeded.

In some embodiments, less than four different threshold scaling parameters may be used. Ultimately, the optimal number of scaling parameters relates to the SNR and peak detection reliability. Overall, the variable threshold factor as a function of position in the STF (i.e., current number of peaks detected) allows minimizing false alarms, missed correlation peaks in the LTF and minimizes side-lobe detection at the beginning of the LTF.

FIG. 6 shows a flow diagram 600 that outlines the steps followed for peak detection using a timer window and a dynamic threshold.

To optimize the detection of the first peak, the dynamic threshold is set to optimize the probability of false detection and peak detection simultaneously. Once a peak is detected, the value of the threshold drops, as discussed above with reference to FIG. 5A.

A peak is detected if the correlator output is higher than the dynamic threshold within the time window. Outside of the timer window, there is no peak detection, unless the correlator output is higher than the highest peak in the session, in which case the detection sequence is reset and restarted based on the new higher peak. The estimation process is restarted only if the number of peaks detected in the session is lower than a predetermined number of peaks (minPeaks).

The time window is set to enable detection when a peak is expected in order to minimize false detections. The test for the highest value of any detected peak out of the timer window allows to restart the detection sequence when the algorithm gets misled by noise peaks in low SNR situations. This test is performed whilst the number of peaks is less than minPeaks, which defines the threshold to determine packet detection.

The timer allows desensitizing detection for a prescribed interval to reduce the probability of false detection due to noise and, at the same time, allows for optimized threshold selection. For example, the timer may be used to disable peak detection for a specified number of samples between peaks, such as 13 samples.

After the first peak is detected, the system may check that no sample in the next 14 samples is larger, in which case it becomes the new first peak. The position of the first peak is a reference point for the timer that is initiated to disable any detection of correlation peaks for a specified number of samples, for example 14 samples, between peaks, as discussed above. The actual ideal timing point is likely to be one of either this point, the previous or the next. Thus these 3 points are defined as the peak window and store the cross-correlated value for the 3 positions. These 3 points are now stored at spacing of 16 samples as each peak is detected.

The system also provides an option to restart peak detection if a peak is not detected in the expected peak window (determined by the timer, for example a window of 3 samples) and the minimum required number of peaks (minPeaks) has not yet been reached.

Figure 7A:
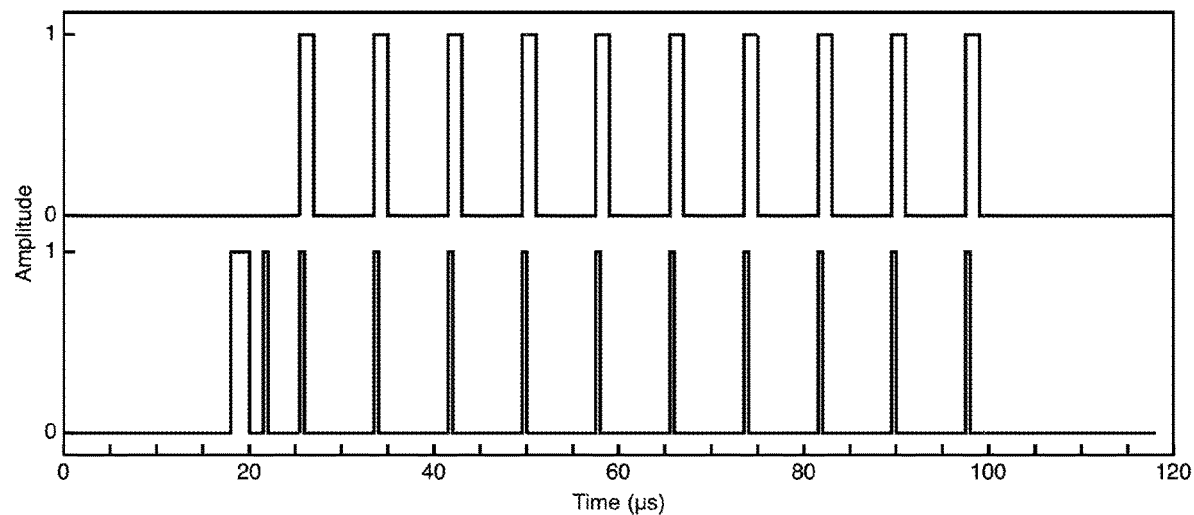
FIG. 7A shows an example of the first peak detection and 3 sample windows with 20 dB SNR, 2 MHz full band.
Figure 7B:
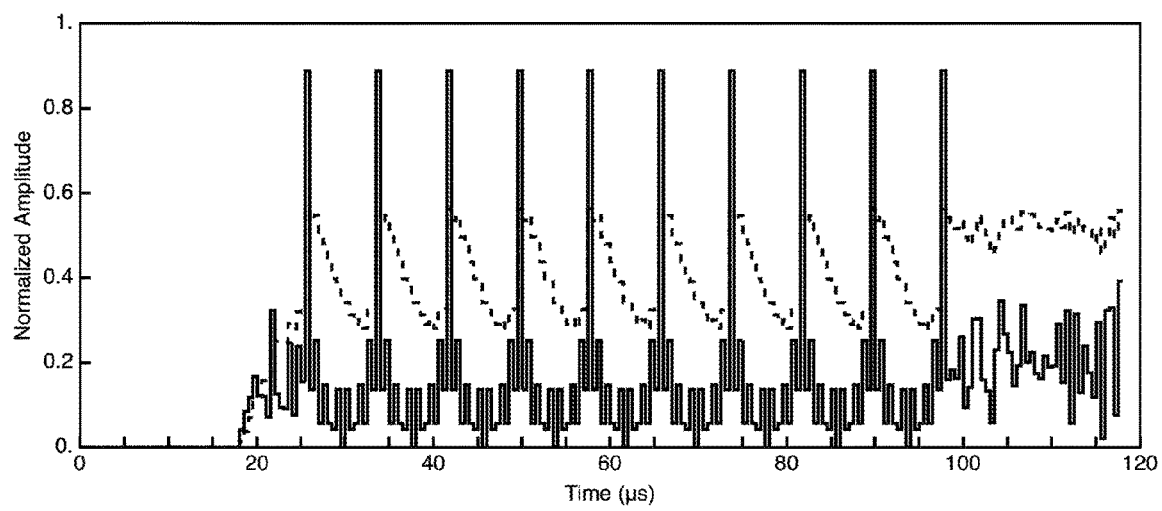
FIG. 7B shows a plot with the cross-correlation peaks and the dynamic threshold.

FIG. 7A shows an example of the first peak detection and 3 sample windows with 20 dB SNR, 2 MHz full band. FIG. 7A shows the peak detection, including false alarm peaks and FIG. 7B shows the cross-correlation peaks (solid line) and the dynamic threshold (dashed line).

While the number of peaks detected is between minPeaks and maxPeaks the STF peak detection threshold is managed as discussed above with reference to FIG. 5 and FIG. 6. An algorithm for detection of the first long training field (LTF) can begin running after the number of STF detected peaks reaches minPeaks. When the number of STF detected peaks reaches maxPeaks, a packet is deemed to be detected and the dynamic threshold can be increased to minimize the probability of detection of a LTF side lobe. The probability of detecting a LTF side lobe is higher when one or more peaks at the beginning of the STF have been missed. In addition, the STF peaks can be compared with a LTF timing point to determine whether they are a suitable STF peak or should be discarded.

In order to detect false peak detection, the algorithm can calculate an average SNR metric from detected peaks and determine a difference between average peak signal strength for a false alarm condition versus a genuine STF correlation pattern. This can be achieved using a signal peak metric or a noise metric.

The signal-peak metric method calculates a representation of peak signal strength by summing the 3 sample peak averages. The noise metric is the average of the dynamic thresholds for peaks detected up to minPeaks.

A false alarm is detected if the signal peak metric, after reaching minPeaks is higher than a false alarm threshold value multiplied by the noise metric. The false alarm threshold is set based on the characteristic of the channel and the overall system. If a false alarm is detected, it is likely that an STF signal has not been detected and the peak detection process should restart.

In some instances, a false alarm can be triggered if a large sudden change in peak strength is detected before a minPeaks is reached.

A packet can be deemed as detected if the number of detected correlation peaks equals maxPeaks or the number of detected correlation peaks is higher than minPeaks and a peak (or more) is missed in the expected time window.

The long training field (LTF) of the 802.11 PPDU allows to estimate frequency and timing of the incoming packets more accurately.

Frequency estimation using the LTF can be performed by autocorrelation of the LTF peaks or cross-correlation. The method disclosed herein uses autocorrelation of the LTF for 64 samples for the IEEE 802.11ah PPDU.

This disclosure provides a method for estimating timing and/or frequency of a wireless signal using a combination of the STF estimate and the LTF estimate. The STF estimate is calculated using the methodology described above with reference to FIGS. 3 to 7.

Figure 8:
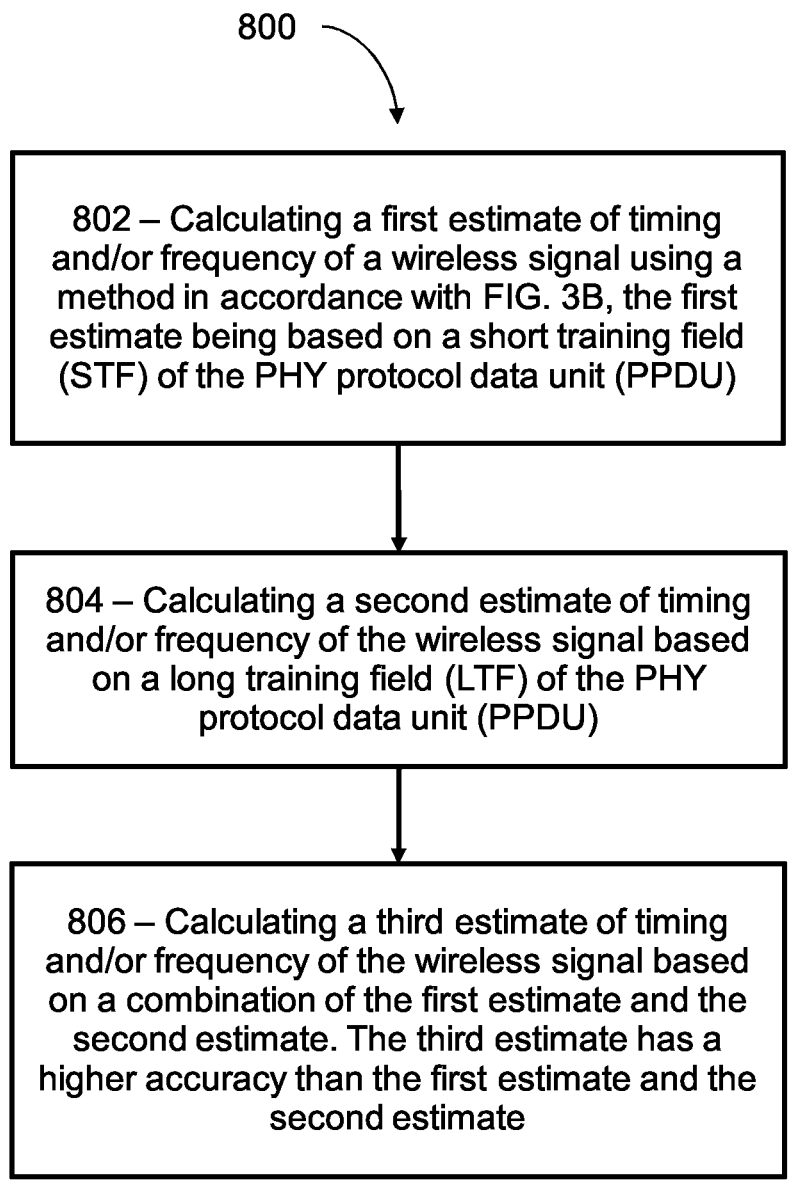
FIG. 8 shows a flow diagram outlining steps of a method for estimating timing and/or frequency of a wireless signal using a combination of the STF estimate and the LTF estimate, in accordance with embodiments.

FIG. 8 shows a flow diagram 800 outlining the main steps of the combined method. A first estimate of timing and/or frequency of the signal is calculated using a methodology in line with FIG. 3B (802). The first estimate is based on the STF. A second estimate of timing and/or frequency is calculated using the LTF (804). Finally, the two estimates are combined to obtain a third, more accurate estimate of timing and/or frequency of the signal (806). The first estimate can be used to unwrap the phase of the second estimate. The combination of the first and second estimate is calculated using weighting coefficients for each peak and weighting the STF peaks using the identified coefficients.

The autocorrelation based LTF frequency estimators has a frequency estimation range limited to:

$$-0.5\ Fs/Nd < Fmax < 0.5\ Fs/Nd$$

where Nd=64 is the number of delay samples in the autocorrelation and Fs is the sample rate.

This means it is natural that the STF is used for a coarse correction and then the LTF offers fine improvements within the capabilities of its frequency range. Phase wrapping is more pronounced for the LTF than for the STF and for lower bandwidths subchannels more than higher bandwidths subchannels.

The LTF correlated peaks are far enough from each other to allow a small frequency offset between the transmitter and the receiver to generate enough phase shift to cover a full 2H circle (phase wrap). Although the phase of the LTF estimate wraps, it remains uncorrupted. In this disclosure, the STF is leveraged to determine whether there has been sufficient drift for the LTF to wrap and how many times the LTF phase may have wrapped, so that the LTF can be unwrapped. The STF is suitable to determine whether wrapping has occurred as the peaks are close to each other, and no feasible level of frequency offset would allow for the SFT phase to wrap.

The unwrapped LTF can be calculated using the expression below:

$$F_{LTF} = F_{LTF} + \text{sign}(F_{STF}) Fs/Nd\ \text{(in Hz)}$$

If $\text{sign}(F_{STF}) < > \text{sign}(F_{LTF})$ and $\text{abs}(F_{STF}) > 0.25\ Fs/Nd$ or $\text{abs}(F_{STF}) > 0.75\ Fs/Nd$ Nd (64) is the number of delay samples in the autocorrelation and Fs is the sample rate. The ¼ and ¾ factors are in between the wrapping frequencies and so the $F_{STF}$ does not need to be very accurate for this scheme to work. The factors are selected to optimally minimize decision error given STF uncertainty.

The two estimates may be described by random variables $F_{STF}$ and $F_{LTF}$ with variances $S(F_{STF})$ and $S(F_{LTF})$, respectively. Simulations indicated that when using 10 peaks for STF and 64 samples for LTF, $S(F_{LTF}) \cong S(F_{STF}) = S$. By applying the STF received input signal to the LTF and averaging the two estimators, the final frequency estimate variance is halved in this case and thus given by $S(F_{FINAL}) = S/2$.

The reduction in estimator variance can substantially improve the minimum required SNR but consideration of the number of peaks used in the STF must be made.

The STF estimator variance is a linear function of the number of correlation peaks used. The range of the number of peaks (min, max) is programmable but the actual number of observed peaks is statistical within this range.

$\text{Var}(F_{STF}) = k \cdot nP$ where $nP$ is the number of STF peaks.

The final frequency estimate can be a linear combination of the STF and LTF frequency estimate values and the weight for the STF and LTF components is a function of nP.

$F_{FINAL} = w_{STF} F_{STF} + (1 - w_{STF}) F_{LTF}$ if $nP > 3$ and $w_{STF} = (nP - 3)/16$.

$w_{STF}$ can be optimized by running simulations for different values of nP to minimize the value of packet error rate (PER). For $nP \leq 3$, one should only use $F_{LTF}$ since the variance of the STF is too high. A halving of PER can be achieved between LTF only and LTF+STF averaging with a high number of detected STF correlation peaks.

In some instances, the STF may detect an unwanted cross-correlation side-lobe peak in the LTF. This can badly corrupt the STF frequency estimate. This issue is mitigated by using the variable threshold scheme discussed above with reference to FIG. 5, and completely solved by using the LTF timing point to determine which STF peaks are too late and deleting those peaks from the calculation.

The LTF timing point (i.e., when the correlator triggers in the LTF) has a well-defined relationship to the last peak of the STF given by the LTF guard interval+LTF correlator length. Furthermore, this can also be used to remove any STF peaks that occur too early due to a false alarm which overlaps the actual STF.

In order to reduce the STF variance at the frequency extremes, the maximum absolute value of the STF can be limited to the maximum specification (+/−38 kHz).

The methodologies discussed above allow performing a correct estimation of the frequency even when the initial frequency gap is large. The advanced algorithms used to leverage signal data from the STF and LTF fields can lead to more accurate frequency and timing estimates. The methods allow maintaining low sample rates which allows for lower complexity whilst maintaining estimation accuracy by using all the available information out of the correlator.

Figure 9:
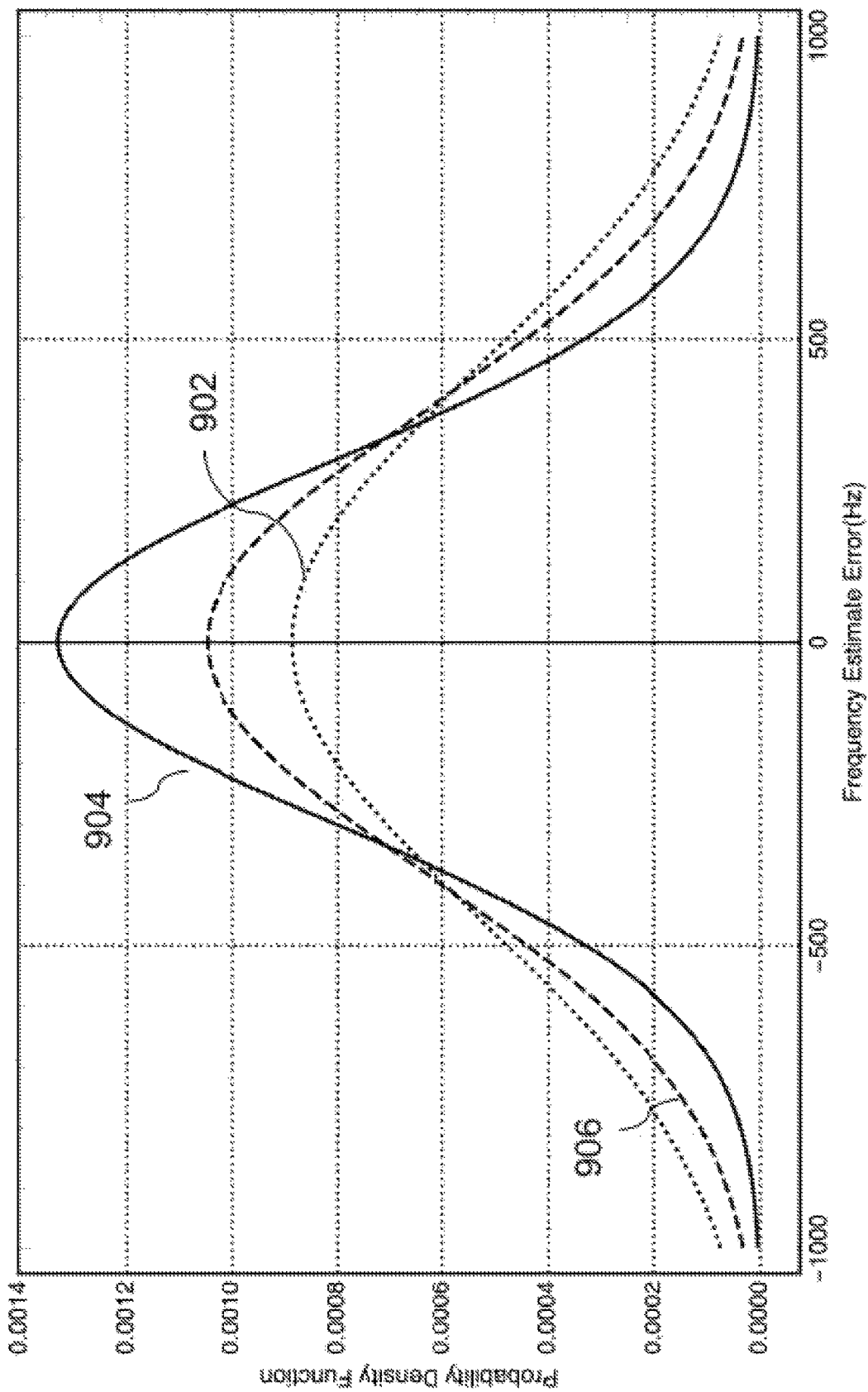
FIG. 9 shows distributions of frequency estimation error for some of the frequency estimators provided in embodiments.

FIG. 9 shows distributions of frequency estimation error for some frequency estimators discussed above. The data in FIG. 9 is obtained with an SNR=2 dB, frequency offset=0 kHz (to avoid wrapping) and 9000 packets. The autocorrelation with 64 samples in dotted line 902 has 90% confidence intervals of 970 Hz which is still too high for operation at this SNR. The optimally combination of data from the STF and LTF, as discussed above, is shown by the solid line 904 which provides 90% confidence intervals of 770 Hz, reasonable for this SNR. The dashed line 906 shows a middle ground result for cross-correlation with 64 samples.

Although throughout this specification reference has been made to IEEE 802.11ah, for example to describe the PPDU and the STF and LTF fields, the invention can find application to frequency and timing estimation of any 802.11 packet type that comprises STF and LTF fields, such as 802.11ax, 802.11ac or 802.11be.

Although the invention is illustrated and described herein with reference to specific embodiments, the invention is not intended to be limited to the details shown. Rather, various modifications may be made in the details within the scope and range of equivalents of the claims and without departing from the invention.

It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

Throughout this specification, unless the context clearly requires otherwise, the word "comprise", or variations such as "comprises" or "comprising", will be understood to imply the inclusion of a stated element, integer or step, or group of elements, integers, or steps, but not the exclusion of any other element, integer or step, or group of elements, integers, or steps.

Any discussion of documents, acts, materials, devices, articles or the like which has been included in the present specification is solely for the purpose of providing a context for the present technology. It is not to be taken as an admission that any or all these matters form part of the prior art base or were common general knowledge in the field relevant to the present technology as it existed before the priority date of each claim of this specification.

Definitions of acronyms in the PHY preamble of FIG. 2

| Field | Description |
|---|---|
| STF | Short Training field |
| LTF | Long Training field |
| SIG | SIGNAL field |
| SIG-A | SIGNAL A field |
| D-STF | Short Training field for the beam changeable portion |
| D-LTF | Long Training field for the beam changeable portion |
| SIG-B | Signal B field |
| Data | The Data field carries the PSDU(s) |
| GI | Guard Interval |
| GI2 | double Guard Interval |
| LTS | Long Training Symbol |

What is claimed is:

1. A method for estimating timing and/or frequency of a wireless signal; the method comprising the steps:
   receiving a digitally modulated signal;
   extracting a plurality of signal samples associated with a short training field (STF) of a PHY protocol data unit (PPDU) of an 802.11 frame;
   performing correlation operations on the plurality of signal samples to generate a predetermined number of correlation peaks;
   comparing one or more correlation peaks related to the STF with a long training field (LTF) timing point to determine whether any detected correlation peaks should be discarded;
   comparing the generated correlation peaks with a variable dynamic threshold; and
   calculating timing and/or frequency of the digitally modulated signal using the outcome of the comparing step.

2. The method of claim 1, wherein the variable dynamic threshold is configured to minimize a number of false peak detections.

3. The method of claim 1, wherein the variable dynamic threshold decreases with a distance from a last detected correlation peak.

4. The method of claim 1, wherein the variable dynamic threshold is calculated by applying low-pass filtering to the correlation peaks.

5. The method of any one of claim 1, wherein a scale factor based on the number of correlation peaks detected is used to scale an envelope of the variable dynamic threshold.

6. The method of claim 1, wherein the step of performing correlation operations on the plurality of signal samples to generate a predetermined number of correlation peaks comprises averaging phase differences of the signal samples.

7. The method of claim 1, further comprising the step of reducing the variable dynamic threshold after a first correlation peak has been detected to optimize the probability of detecting another correlation peak.

8. The method of claim 1, further comprising the step of reducing the variable dynamic threshold once a predetermined number of correlation peaks related to the STF for the PPDU have been detected.

9. The method of claim 1, further comprising the step of increasing the variable dynamic threshold after a predetermined amount of time corresponding with the duration of the STF, to minimize the probability of detection of a long training filed (LTF) side lobe.

10. The method of claim 1, wherein the method further comprises sensing an amount of energy on a wireless medium (WM) and setting a value of the variable dynamic threshold based on the amount of energy.

11. The method of claim 1, wherein the method further comprises sensing baseline noise present on a channel and setting a value of a predetermined coefficient used to tune the variable dynamic threshold based on the baseline noise.

12. The method of claim 1, further comprising determining whether a false peak detection has occurred using one or more of the following steps:
restarting peak detection if a required number of correlation peaks is not detected in a predetermined time window;
calculating an average SNR metric from detected correlation peaks and determining a difference between a genuine pattern of correlation peaks related to a STF and a false detection pattern;
detecting a correlation peak with maximum intensity before reaching a required minimum number of correlation peaks;
detecting a large sudden change in correlation peak strength before a minimum number of correlation peaks is detected.

13. The method of claim 1, wherein the step of performing correlation operations on the plurality of signal samples to generate a predetermined number of correlation peaks comprises cross-correlating the plurality of signal samples across at least 3 correlation peaks.

14. The method of claim 1, wherein the step of performing correlation operations on the plurality of signal samples to generate a predetermined number of correlation peaks comprises autocorrelating the plurality of signal samples.

15. A device for estimating timing and/or frequency of a wireless signal, the device comprising:
a receiver module configured to receive a digitally modulated signal;
an antenna unit communicatively coupled to the receiver module;
a packet detect module configured to analyze a PHY protocol data unit (PPDU), the PPDU having a plurality of signal samples associated therewith;
a correlator configured to perform operations on the plurality of signal samples; and
at least one processor and memory, the memory having software that when executed by the at least one processor causes the at least one processor to perform operations, the operations comprising;
receiving the digitally modulated signal,
extracting the plurality of signal samples associated with a short training field (STF) of the PPDU of an 802.11 frame,
performing correlation operations on the plurality of signal samples to generate a predetermined number of correlation peaks,
comparing one or more correlation peaks related to the STF with a long training field (LTF) timing point to determine whether any detected correlation peaks should be discarded,
comparing the generated correlation peaks with a variable dynamic threshold, and
calculating timing and/or frequency of the digitally modulated signal using the outcome of the comparing step.

16. The device of claim 15, the operations further comprising the step of reducing the variable dynamic threshold after a first correlation peak has been detected to optimize the probability of detecting another correlation peak.

17. The device of claim 15, wherein the operations further comprise sensing baseline noise present on a channel and setting a value of a predetermined coefficient used to tune the variable dynamic threshold based on the baseline noise.

18. The method of claim 1, wherein comparing the generated correlation peaks with a variable dynamic threshold is performed in time windows only.

19. The method of claim 18, wherein the predetermined time windows are calculated based on an expected frequency of the correlation peaks.

20. The method of claim 18, wherein, if a correlation peak higher than a highest correlation peak is detected outside of the predetermined time window thereby forming a new higher peak, a frequency and/or timing estimation process is restarted based on the new higher peak.

21. The method of claim 20, wherein the estimation process is restarted only if the number of correlation peaks detected is lower than a predetermined minimum number of correlation peaks.

22. The method of claim 18, wherein, within the predetermined time window, the generated correlation peaks are compared with the variable dynamic threshold, whilst outside of the predetermined time window the generated correlation peaks are compared with a highest value of any correlation peak detected for the digitally modulated signal.

* * * * *